Patented Apr. 21, 1936

2,038,083

UNITED STATES PATENT OFFICE 2,038,083

PROCESS FOR THE DECOMPOSITION OF NITROSYL CHLORIDE

Frank O. Lundstrom and Colin W. Whittaker, Washington, D. C.; dedicated to the free use of the Public No Drawing. Application August 15, 1934, Serial No. 739,964

1 Claim. (Cl. 23—157)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government, for governmental purposes, without the payment to us of any royalty thereon.

We hereby dedicate the invention herein described to the free use of the public to take effect upon the granting of a patent to us.

This invention relates to the decomposition of nitrosyl chloride to form oxides of nitrogen, especially $NO_2$ and $N_2O_4$, and also chlorine at temperatures much lower than that found to be necessary in order to decompose significant amounts of NOCl by heat alone according to the reaction,

$$NOCl + heat = NO + Cl$$

It is stated in Mellor's Treatise on Inorganic and Theoretical Chemistry, volume VIII, page 615, that nitrosyl chloride is only 10.64 per cent dissociated at 815° and 41.85 per cent dissociated at 985°.

We have now found that this decomposition of NOCl together with the oxidation of the NO formed to produce $NO_2$ and $N_2O_4$ may be carried out at temperatures between 150° and 300° C., or if desired, at temperatures up to red heat, when oxygen gas is added to NOCl gas and the NOCl-oxygen mixture is passed through a heated tube without employing contact or absorption agents such as silica gel or metallic substances.

The following example illustrates one way in which NOCl may be decomposed and simultaneously oxidized to $NO_2$ or $N_2O_4$ and $Cl_2$ with a large yield.

Example

Pure liquid nitrosyl chloride (NOCl) is vaporized and the resulting gaseous NOCl passed through a flowmeter to a gas mixing chamber where it is mixed with oxygen gas which has also previously passed through a flowmeter. The oxygen is added in slight excess over the amount theoretically necessary to react molecule for molecule with the nitric oxide (NO), potentially present in the NOCl gas in the mixing chamber, in order to form $NO_2$. The NOCl-oxygen gas mixture is first passed through a tower containing phosphorus pentoxide ($P_2O_5$) and then into a large bulb from which it is allowed to flow into a condenser which is submerged in ice or water at 0° C. The NOCl-oxygen mixture after passing through the aforementioned condenser is passed through a glass reaction tube containing a thermometer well which traverses about three-fourths of the length of the said reaction tube. A thermometer is placed in this thermometer well; the thermometer position can then be shifted so that the temperature in different parts of the reaction tube can be ascertained. The reaction tube with the thermometer well, in which a thermometer is inserted, is placed in an electric combustion furnace. The exit tubing from this reaction tube leads to a condenser similar to that already mentioned, which latter condenser is also submerged in ice or water at 0° C. The gas mixture therefore passes through a condenser, the temperature of which is about 0° C., both before and after passing through the reaction tube located in the electric furnace.

The NOCl-oxygen gas mixture is passed through the glass reaction tube located in the furnace, first at 30° C. and later at varying degrees of temperature up to red heat. Very little $NO_2$—$N_2O_4$ gas will be noted in the reaction tube, the exit tubing and the exit condenser under 150° C. Between 150° and 190° C. a small amount is noticed and between the temperatures of 190° and 300° C., the exit gases appear dark red in color resembling the pure $NO_2$—$N_2O_4$ gas produced from boiling liquid nitrogen peroxide. Since $NO_2$ is appreciably decomposed above 300° C. and fully decomposed at red heat, the color of the gases inside of the heated reaction tube between 300° C. and red heat become progressively lighter red in color as the temperature is raised, indicating that less and less NO and oxygen are combining to form $NO_2$. This is only true inside of the heated glass reaction tube but later when these gases emerge from the furnace they are in contact with the exit tube which is at room temperature or about 30° C. and therefore the gas mixture cools rapidly causing the NO to combine with the oxygen to form $NO_2$. Pure nitrogen peroxide gas may be passed through a tube of similar bore placed adjacent to the exit tube from the furnace for the purpose of comparing the depth of color of the gases issuing from the furnace with that of pure $NO_2$—$N_2O_4$ gas under the same conditions of total pressure, which in this case is that of the atmosphere, and of temperature which is that of the room or approximately 30° C. since the gases cool rapidly after leaving the furnace as previously stated. After a short time a red liquid of the characteristic color of nitrogen peroxide and whose boiling point is approximately 22° C., is condensed at 0° C. in the condenser located on the exit side of the heated glass reaction tube. This red liquid can be shown by chemical and physical tests to be nitrogen peroxide. No liquid condenses at any time in the condenser at the inlet side of the heated tube under the same conditions. The residual gas passing through the exit tube of the condenser containing the condensed liquid nitrogen peroxide is conducted to two bubbling flasks connected in series and containing concentrated $H_2SO_4$, through which the condenser exit gases are allowed to bubble in order to free said gases from traces of nitrogen peroxide or of nitrosyl chloride that may be present. After a short time a gas, green in color, appears in the space above the concentrated sulfuric acid in the flasks and also issues from the exit tube of the second bubbling flask. This gas may be condensed to an orange yellow colored liquid in a condenser submerged in carbon dioxide snow, the temperature of which is approximately —78° C. This yellowish liquid or greenish gas may be shown to be chlorine by physical and chemical tests. The entire apparatus used was constructed of glass.

Various changes may be made in the details disclosed in the foregoing specification without departing from the invention or sacrificing the advantages thereof.

Throughout the specification and claim affixed thereto the expression "nitrogen peroxide" is intended to refer to $NO_2$, $N_2O_4$ or mixtures of $NO_2$ and $N_2O_4$.

Throughout the specification and claim the expression "significant decomposition or dissociation of NOCl" is intended to refer to any small dissociation of NOCl up to the amount of 5.5 per cent.

Having fully disclosed our discovery, we claim:

The process of decomposing nitrosyl chloride gas and oxidizing the resultant nitric oxide to form nitrogen peroxide and chlorine, which comprises mixing the nitrosyl chloride gas with oxygen gas, the oxygen gas being in slight excess of the amount theoretically necessary to react molecule for molecule with the nitric oxide potentially present in the nitrosyl chloride gas to form $NO_2$, drying the gas mixture, heating the nitrosyl chloride-oxygen gas mixture to temperatures of from 190° to 300° C.

FRANK O. LUNDSTROM.
COLIN W. WHITTAKER.